(12) United States Patent
Slankard et al.

(10) Patent No.: US 7,647,888 B2
(45) Date of Patent: Jan. 19, 2010

(54) POULTRY FEEDER

(75) Inventors: Bruce Slankard, Chatham, IL (US); John M. Frankovich, Decatur, IL (US)

(73) Assignee: The GSI Group, Inc., Assumption, IL (US)

( * ) Notice: Subject to any disclaimer, the term of this patent is extended or adjusted under 35 U.S.C. 154(b) by 116 days.

(21) Appl. No.: 12/105,998

(22) Filed: Apr. 18, 2008

(65) Prior Publication Data

US 2008/0257270 A1    Oct. 23, 2008

Related U.S. Application Data

(60) Provisional application No. 60/912,851, filed on Apr. 19, 2007.

(51) Int. Cl.
*A01K 39/01* (2006.01)
(52) U.S. Cl. .................. 119/53; 119/52.4; 119/56.1
(58) Field of Classification Search ............... 119/53, 119/52.4, 56.1, 56.2, 57.4; *A01K 39/00, A01K 39/01, 39/014*
See application file for complete search history.

(56) References Cited

U.S. PATENT DOCUMENTS

| | | | |
|---|---|---|---|
| 5,311,839 A | | 5/1994 | Pollock et al. |
| 5,462,017 A | | 10/1995 | Pollock et al. |
| 5,718,187 A | | 2/1998 | Pollock et al. |
| 5,765,503 A | * | 6/1998 | van Daele ............... 119/52.4 |
| 5,875,733 A | | 3/1999 | Chen |
| 6,050,220 A | * | 4/2000 | Kimmel et al. ............. 119/53 |
| 6,655,317 B1 | * | 12/2003 | Steudler et al. ............. 119/53 |
| 7,107,932 B2 | * | 9/2006 | Cole et al. ................ 119/53 |

(Continued)

FOREIGN PATENT DOCUMENTS

EP    483963 A2 *    5/1992

(Continued)

OTHER PUBLICATIONS

International Search Report from corresponding International Application No. PCT/US2008/060785, mailed Jun. 24, 2008.

(Continued)

*Primary Examiner*—Son T. Nguyen
*Assistant Examiner*—Shadi Baniani
(74) *Attorney, Agent, or Firm*—Polster, Lieder, Woodruff & Lucchesi, L.C.

(57) ABSTRACT

A poultry feeder is provided which can be selectively switched between a mode in which it operates as a flood-type feeder and a mode in which it operates as a shallow-fill type feeder with adjustable height pan walls. The feeder includes a feed tube assembly comprising a drop tube and a feed flooding tube. The drop tube is movable axially relative to the feed flooding tube, which rests on the feed pan. The drop tube and feed flooding tube have windows which are brought into and out of alignment by raising and lowering the drop tube. When the feed flooding tube window is opened, the feeder operates in a flood mode and when the feed flooding tube is closed, the feeder operates in a shallow-fill mode. In this second mode, the effective height of the pan wall can be adjusted to allow chicks and chickens access to the feed.

13 Claims, 9 Drawing Sheets

U.S. PATENT DOCUMENTS

| | | | |
|---|---|---|---|
| 7,228,817 B2 * | 6/2007 | Busse | 119/53 |
| 7,552,697 B2 * | 6/2009 | Busse | 119/53 |
| 7,584,716 B2 * | 9/2009 | Cole et al. | 119/52.4 |
| 2003/0056730 A1 * | 3/2003 | Corti et al. | 119/53 |

FOREIGN PATENT DOCUMENTS

| | | | |
|---|---|---|---|
| EP | 1195087 A | 4/2002 | |
| JP | 2003092947 A | * | 4/2003 |
| WO | WO 02/056675 A1 | * | 7/2002 |

OTHER PUBLICATIONS

International Written Opinion from corresponding International Application No. PCT/US2008/060785, mailed Jun. 24, 2008.

* cited by examiner

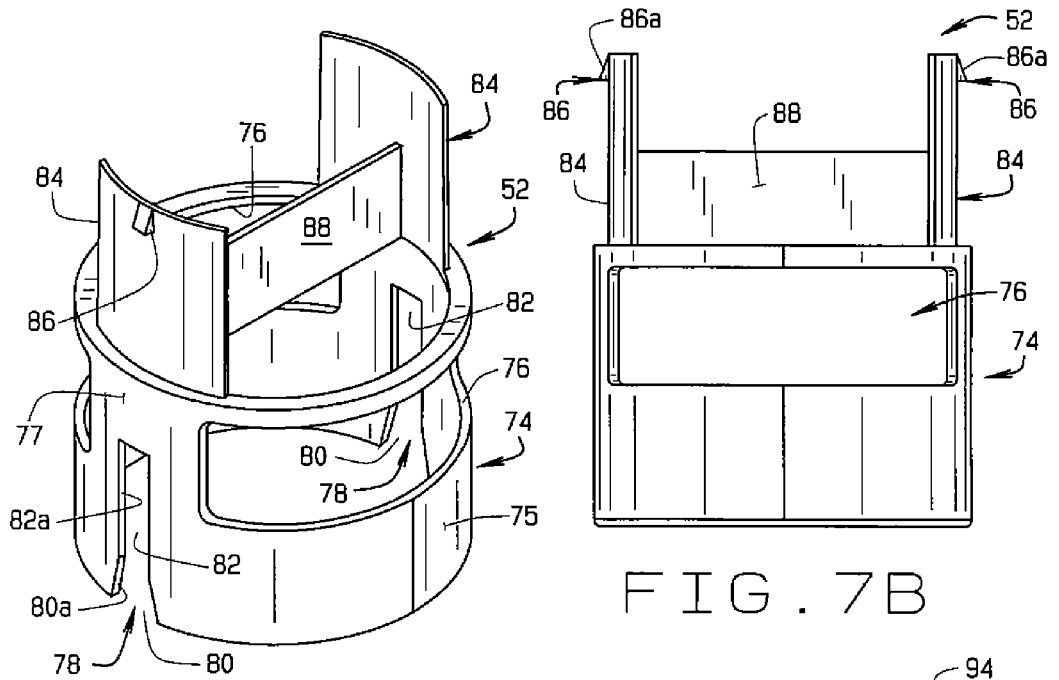
FIG. 7A
FIG. 7B
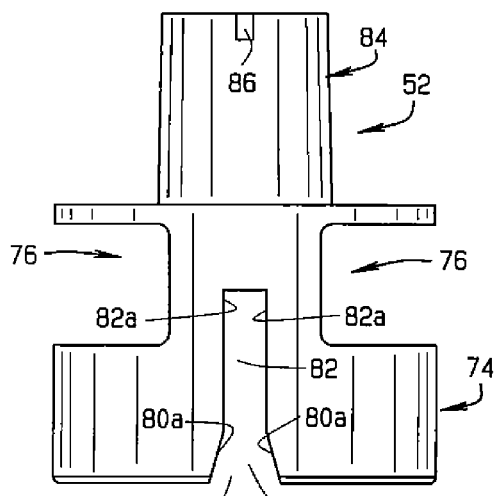
FIG. 7C
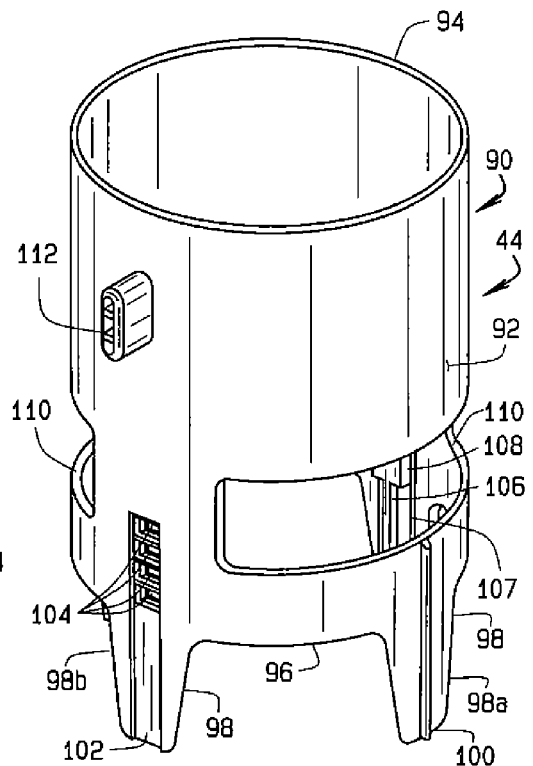
FIG. 8A

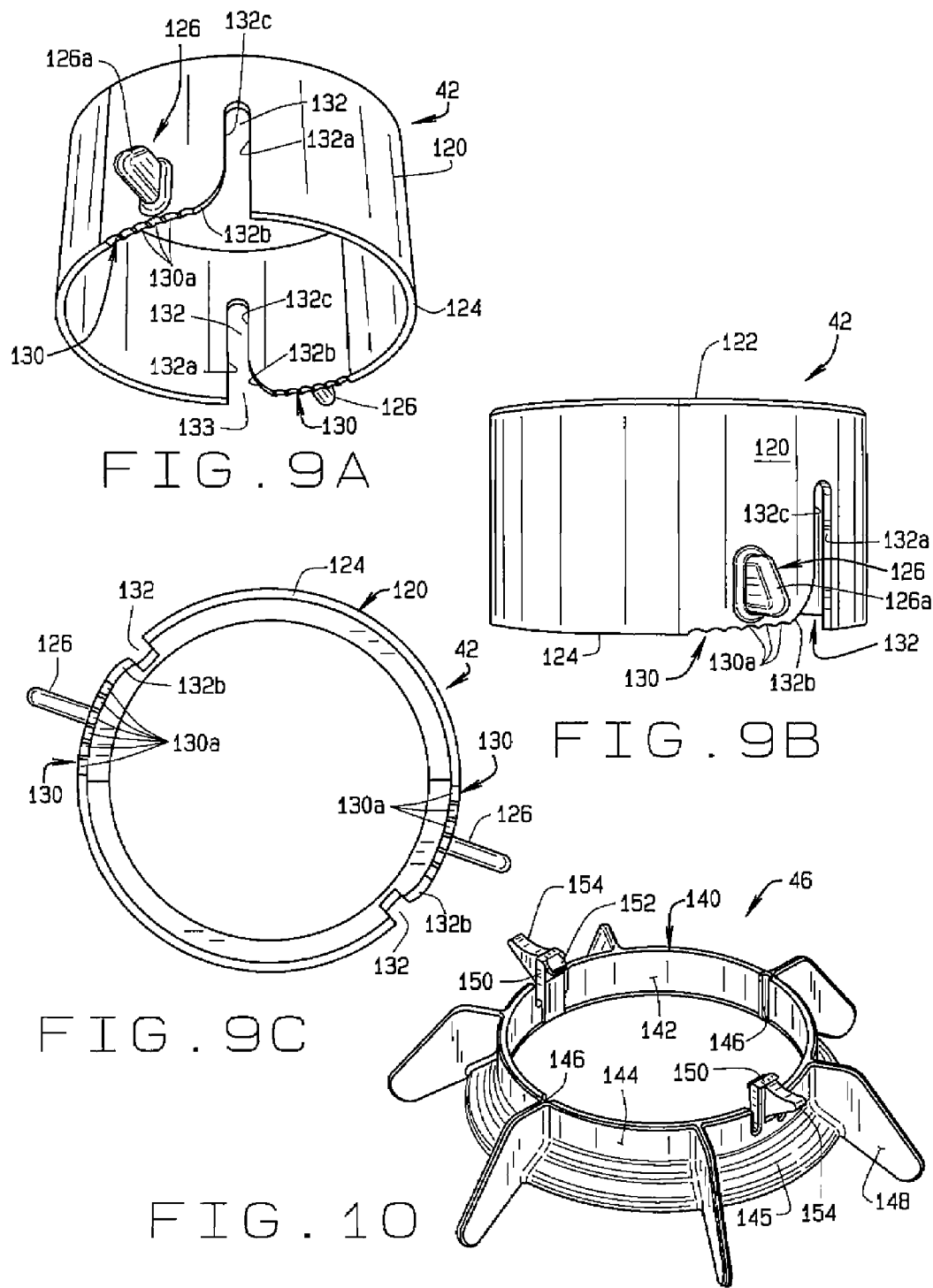

POULTRY FEEDER

CROSS-REFERENCE TO RELATED APPLICATIONS

This application claims priority to U.S. Provisional Application No. 60/912,851 filed Apr. 19, 2007 and which is incorporated herein by reference.

STATEMENT REGARDING FEDERALLY SPONSORED RESEARCH OR DEVELOPMENT

Not Applicable.

BACKGROUND OF THE INVENTION

This application relates to poultry feeders, and, in particular, to a poultry feeder which can operate both in both a shallow fill mode (as with a Hi-Lo®-type of feeder) and in a flood-fill mode (as with a flood feeder).

In large chicken raising operations, the birds are typically owned by an integrator and the farmer raises the birds from chicks to chickens for the integrator. Often, the integrator will dictate to the farmer the type of equipment the farmer should use for caring for the birds, including the type of feeders to use. Currently, there are essentially two types of feeders on the marker. There is a feeder having an adjustable height feed pan, such as the Hi-Lo® feeder available from the Cumberland division of The GSI Group, and flood feeders. In flood feeders, the feeder pan is generally filled with feed. Because the feeder pan is filled, the feed can go stale within the pan. An adjustable height feed pan feeder is shown, for example, in U.S. Pat. Nos. 5,311,839, 5,462,017 and 5,718,187, all of which are incorporated herein by reference. In these feeders the effective pan depth can be altered by raising a feeder rim as the birds grow from chicks to chickens. The changing of the pan depth allows for the birds to have access to the feed as necessary during their growth, without depositing as much feed in the pan as is required by flood feeders, that is, the feeder can be operated with a shallow fill of feed. The use of adjustable height feed pan feeders thus reduces the amount of feed which may go stale.

Because the integrators often dictate which type of feeder a farmer must use, if a farmer's contract with an integrator is canceled, it may be difficult for the farmer to obtain a new contract with a different integrator that requires or allows the farmer to use the same type of feeder. If the farmer obtains a contract with an integrator that requires different feeding equipment, the farmer will have to replace the feeders currently being used and invest considerable sums of money in new feeders and associated equipment. As can be appreciated, this can cause a significant financial hardship to the farmer, and could even force the farmer into bankruptcy.

BRIEF SUMMARY OF THE INVENTION

Briefly stated, a poultry feeder is disclosed having a pan, a drop tube assembly, and a grill. The pan has a floor and a side wall. The grill has an annular wall which surrounds the pan side wall and is movable relative to the side wall between a lowered position in which the feeder has an effective lower wall height and a raised position in which the feeder has an effective higher wall height. The grill further includes a plurality of spokes extending from a top of the annular wall with a ring connecting upper ends of the spokes.

The feed tube assembly comprises a drop tube and a feed flooding tube. The drop tube has an upper portion which extends through the grill ring and a lower portion. The feed tube assembly upper portion has opposed openings through which a feed conduit can pass. The lower portion has a dimension greater than an inner diameter of the grill ring, such that the grill ring is supported by the drop tube lower portion. Lastly, the lower portion includes a drop tube window spaced above the bottom of the drop tube.

The feed flooding tube is sized and shaped to axially receive the drop tube assembly. The feed flooding tube has a bottom edge, legs extending down from the bottom edge, and a feed flooding tube window spaced above the feed flooding tube bottom edge. The feed flooding tube window has a height no greater than the distance between the bottom of the drop tube and the bottom of the drop tube window. The legs support the feed flooding tube on the pan such that the bottom edge of the feed flooding tube is spaced above the pan floor. Feed can thus exit the feed tube assembly through the spaces between the feed flooding tube legs.

A locking collar is sized to fit over the feed flooding tube and is shaped to be movable axially and rotationally relative to the feed flooding tube. The locking collar is movable axially on the feed flooding tube between a raised position in which the locking collar supports the grill in the grill's raised position and a lowered position. In the lowered position of the collar, the grill can be moved between a raised and a lowered position by raising and lowering of the drop tube assembly. Thus, the locking collar forms a means for selectively moving the grill between the raised (deep pan) position and the lowered (shallow pan) position.

The drop tube is selectively movable between a lowered position relative to the feed flooding tube and a raised position relative to the feed flooding tube. In the lowered position of the drop tube, the drop tube window is aligned with the feed flooding tube window to define an upper exit through which feed can pass to enter the pan. In the raised position of the drop tube the portion of the drop tube below the drop tube window closes the feed flooding tube window, such that the upper exit is closed. When the drop tube is in its lowered position both the upper and lower exits are opened, allowing the feeder pan to be flooded with feed. Conversely, when the drop tube is in its raised position only the lower exit is opened, and the pan can be filled only to a shallow extent. Hence, the drop tube comprises means for changing the feeder between its flood-fill mode of operation and its shallow-fill mode of operation.

Further, when the drop tube is in its lowered position, the grill can be selectively moved between its raised and lowered positions to selectively adjust the effective height of the pan wall. By increasing the range of motion of the drop tube relative to the grill, the feeder can be switched between a flood-fill mode and a shallow-fill mode and the grill can be moved between a raised position and a lowered position, irrespective of the positioning of the locking collar.

BRIEF DESCRIPTION OF THE SEVERAL VIEWS OF THE DRAWINGS

FIGS. 7A-C are perspective, front elevational and side elevational views, respectively of a drop tube extension of the feeder;

FIGS. 8A-E are perspective, top perspective, side elevational, front elevational, and top plan views, respectively, of a feed flooding tube of the feeder;

FIGS. 9A-C are perspective, side elevational and bottom perspective views, respectively, of a locking collar of the feeder; and FIG. 10 is a perspective view of a feed level ring for use with the feeder.

Corresponding reference numerals will be used throughout the several figures of the drawings.

DETAILED DESCRIPTION OF THE INVENTION

Figure 1:
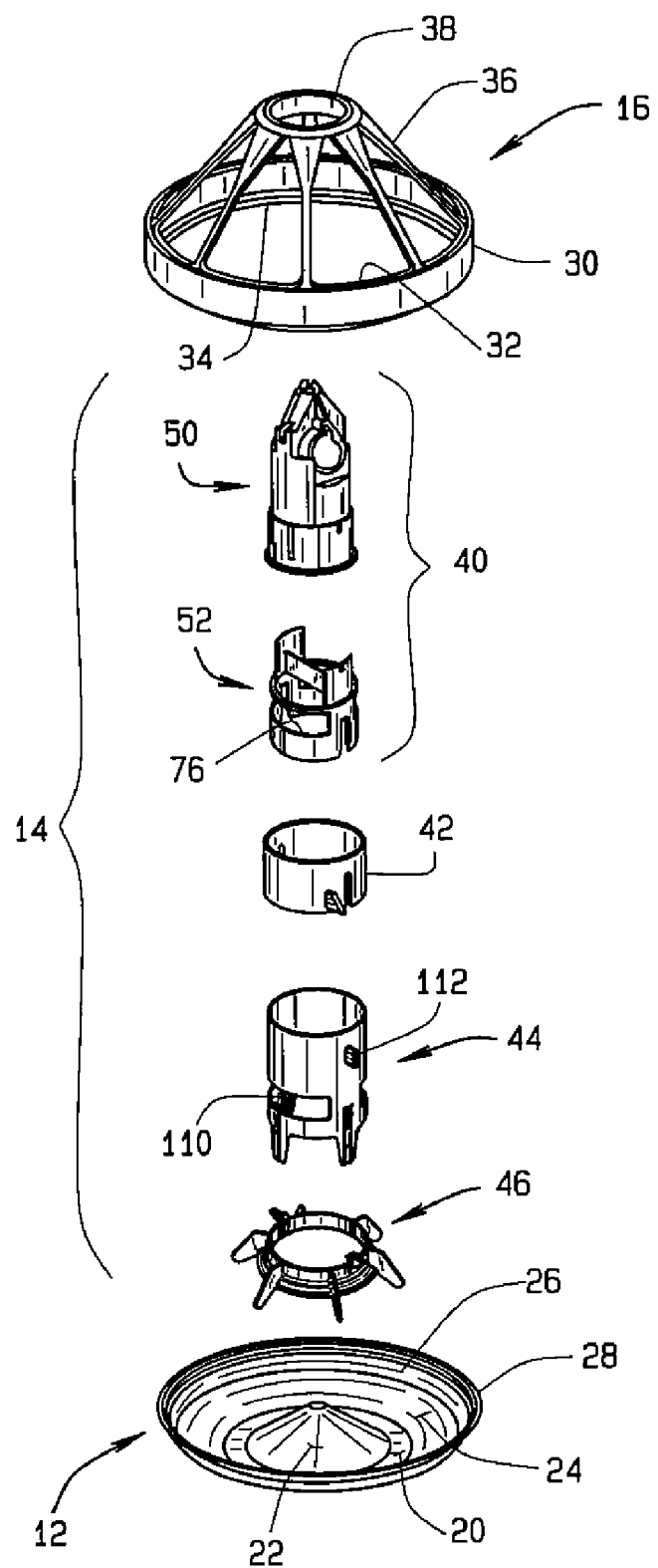
FIG. 1 is a perspective exploded view of an illustrative feeder made in accordance with the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

An illustrative feeder 10, made in accordance with the present invention, is shown generally in FIGS. 1-5B. The feeder 10 includes a pan 12, a feed tube assembly 14 and a grill 16. As will be described below, the feed tube assembly can be selectively switched between a first position (FIGS. 4A,B, 5A,B) in which the feeder can be operated in a shallow-fill mode and a second position (FIGS. 2A,B, 3A,B) in which the feeder can be operated in a flood-fill mode. Hence, if a farmer formally had a contract with an integrator which required, for example, the use of flood feeders, and entered into a contract with a different integrator which requires the use of adjustable height feed pan feeders, the farmer need not buy all new equipment. Rather, the farmer need only change the mode in which the feeders operate.

The pan 12 includes a floor 20 surrounding a central cone 22 (which is shown to be generally domed at its peak). A sloped wall 24 extends upwardly from the floor 20, and a generally vertical wall 26 extends upwardly from the sloped wall 24. A lip 28 extends outwardly from the vertical wall 26 at the top of the wall 26. The lip 28 is preferably a circumferential lip, and thus extends completely around the wall 26. If desired, the lip need not be continuous, but could comprise a series of discrete lips.

The grill 16 comprises a circumferential wall 30 having an inner diameter that is slightly greater than the outer diameter of the lip 28 of the pan 12. The grill wall 30 includes upper and lower lips 32 and 34 which extend inwardly from the top and bottom of the grill wall, respectively. As seen in FIG. 2B, the grill wall 30 is positioned on the pan 12 such that the lip 28 of the pan is between the lips 32 and 34 of the grill wall 30. As seen by comparing FIGS. 2B and 3B, the grill wall 30 and the pan 12 can thus move vertically relative to each other to alter the effective depth of the pan. The length of travel of the grill wall and pan relative to each other is limited by the size of the grill wall 30. As can be appreciated, the grill wall lips 32 and 34 act as stops to prevent the grill wall 30 from coming off the pan 12.

A plurality of spokes 36 extend upwardly from the grill upper lip 32. The spokes 36 are generally T-shaped in cross-section, having an outer portion 36a (FIG. 2A) and a rib potion 36b arranged generally normal to the outer portion 36a. A ring 38 joins the spokes at the tops of the spokes 36. A tube 39 (shown to be generally cylindrical) extends downwardly from the inner diameter edge of the ring 38. As seen in FIG. 2B, a gap is formed between the tube 39 and the inner end of the rib portion 36b of the T-shaped spokes 36. The ring 38 and tube 39 have inner diameters sized to allow the feed tube assembly 14 to pass through them, as will be described in more detail below. As seen in the drawings, the spokes 36 are generally straight, giving the grill an overall appearance of a truncated cone. The ribs or spokes could, however, have other configurations. For example, the spokes could define more of a box shape, as seen for example in FIGS. 2 and 3 of U.S. Pat. No. 5,718,187, which is incorporated herein by reference.

The feed tube assembly 14 allows the feeder to be changed between the shallow-fill mode of operation and the flood-fill mode of operation. The feed tube assembly 14 comprises a drop tube 40, a locking collar 42, and a feed flooding tube 44. A feed level ring 46 is mounted to the bottom of the feed flooding tube 44 to regulate the height of the feed when the feeder is operated in the shallow-fill mode. These elements and the manner in which they interact will be described below.

Figure 6A:
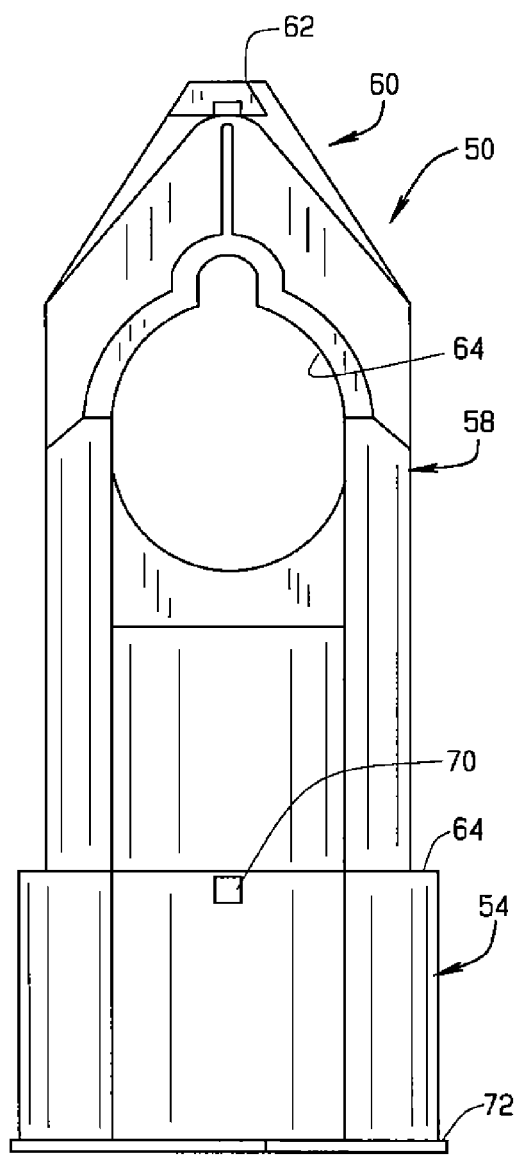
FIGS. 6A and B are front and side elevational views, respectively, of a drop tube of the feeder.
Figure 6B:
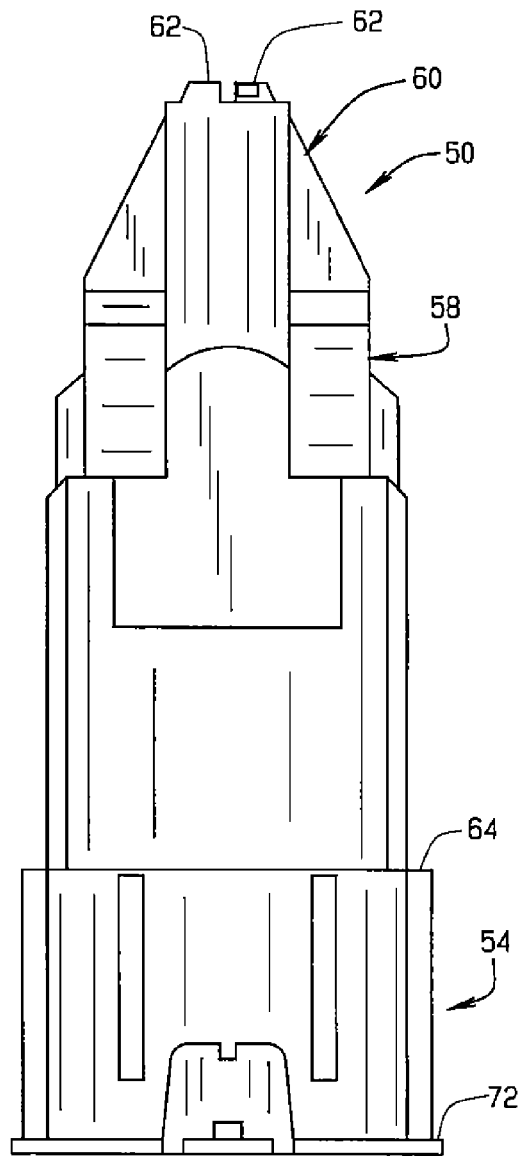

The drop tube 40 includes a main portion 50 which extends through the grill ring 58 and a drop tube extension 52 at the distal end of the main portion 50. The drop tube main portion 50 is generally similar to the drop tube main portion as described in and shown in FIGS. 6-10 of co-owned U.S. Pat. No. 6,470,826, the description of which is incorporated herein by reference. The drop tube main portion 50 (FIGS. 6A,B) includes a bottom section 54 and an upper section 58. The upper section 58 is sized to pass through the grill ring 38 and tube 39, and hence, has a diameter slightly smaller than the inner diameter of the grill ring. The upper portion has a sloped top portion 60 with a pair of opposed fingers 62. An anti-roost wire (not shown) can be passed through the fingers to be secured in place above the feeders. Opposed openings 64 are formed in opposite sides of the upper portion 58. The openings 64 are sized to receive a feed pipe or conduit 65. As is known the feed pipe or conduit 65 is in communication with a supply of feed. The pipe 65 generally includes a motor-driven auger to deliver feed to the feeders. As disclosed in the just noted U.S. Pat. No. 6,470,826, the drop tube main portion 50 is preferably formed in two parts, which in combination, form the openings 64. Hence, the drop tube main portion 50 can be assembled onto a feed conduit, to facilitate not only assembly of a complete feed system, but to allow for removal and replacement of feeders, should this be necessary.

Figure 3A:
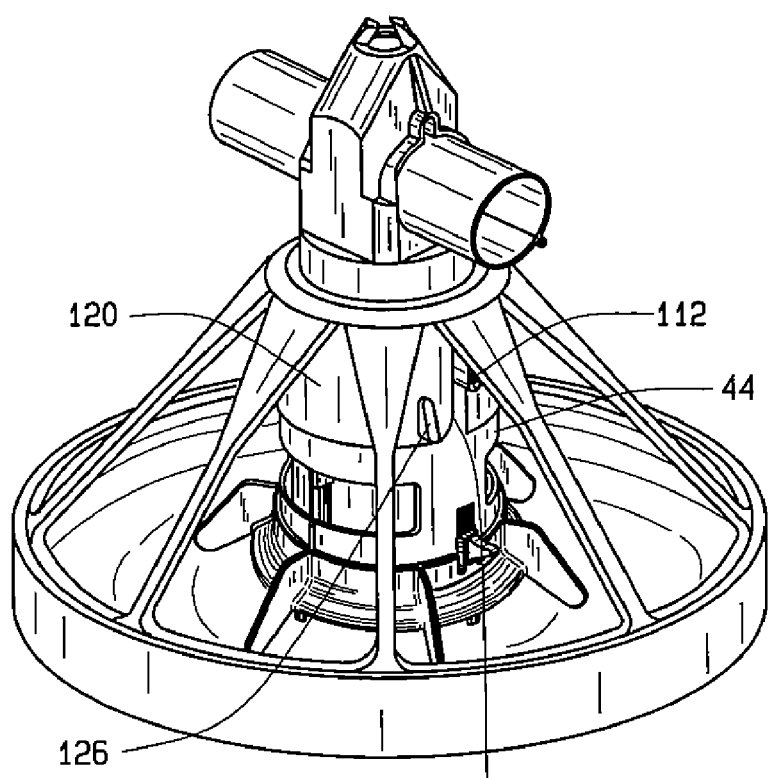
FIGS. 3A and 3B are perspective and cross-sectional views, respectively, of the feeder in a flood-fill mode in a shallow pan configuration.
Figure 3B:
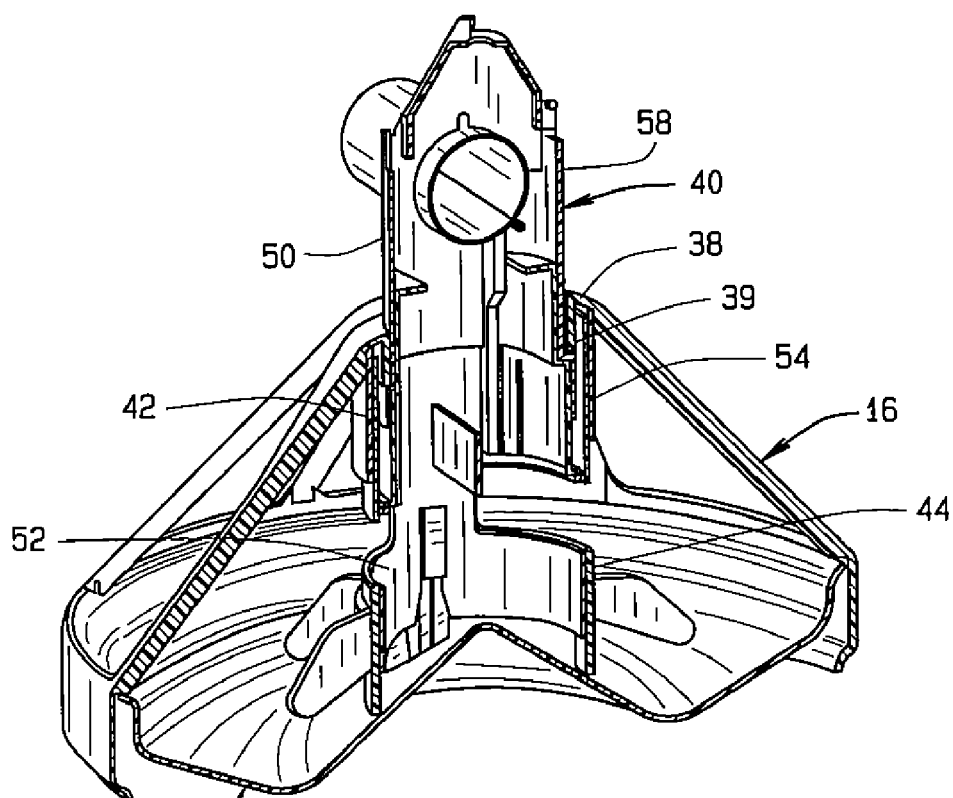
Figure 4A:
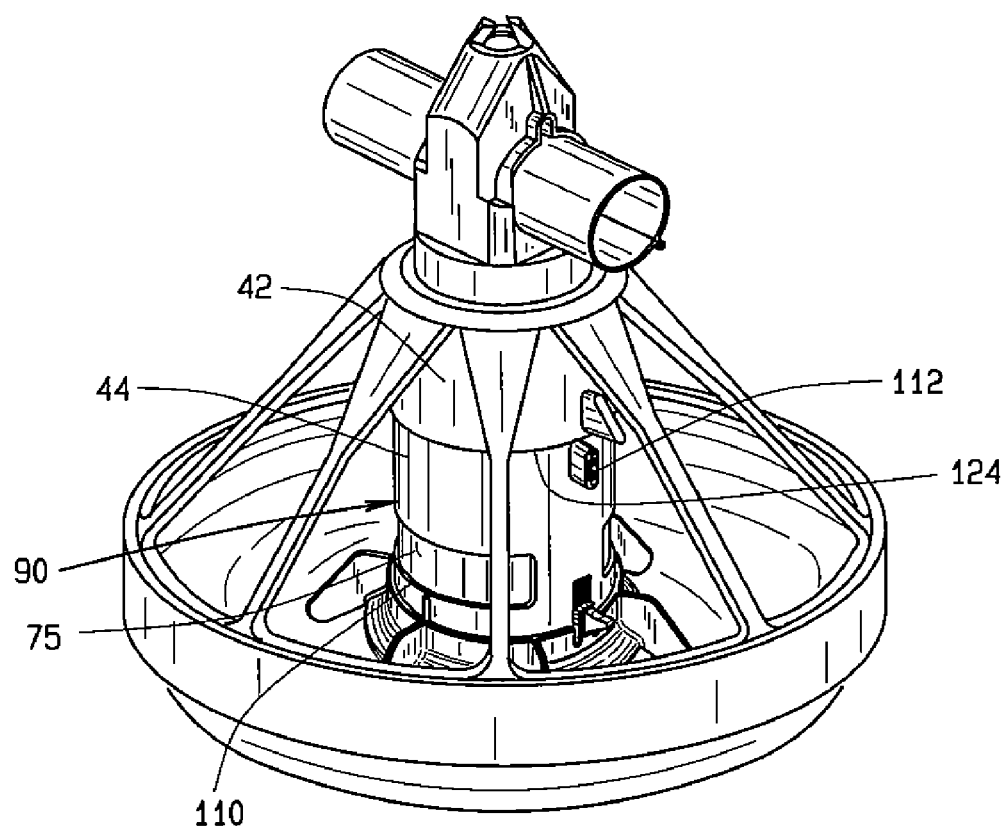
FIGS. 4A and 4B are perspective and cross-sectional views, respectively, of the feeder in a shallow-fill mode with the pan locked in a deep pan configuration.
Figure 4B:
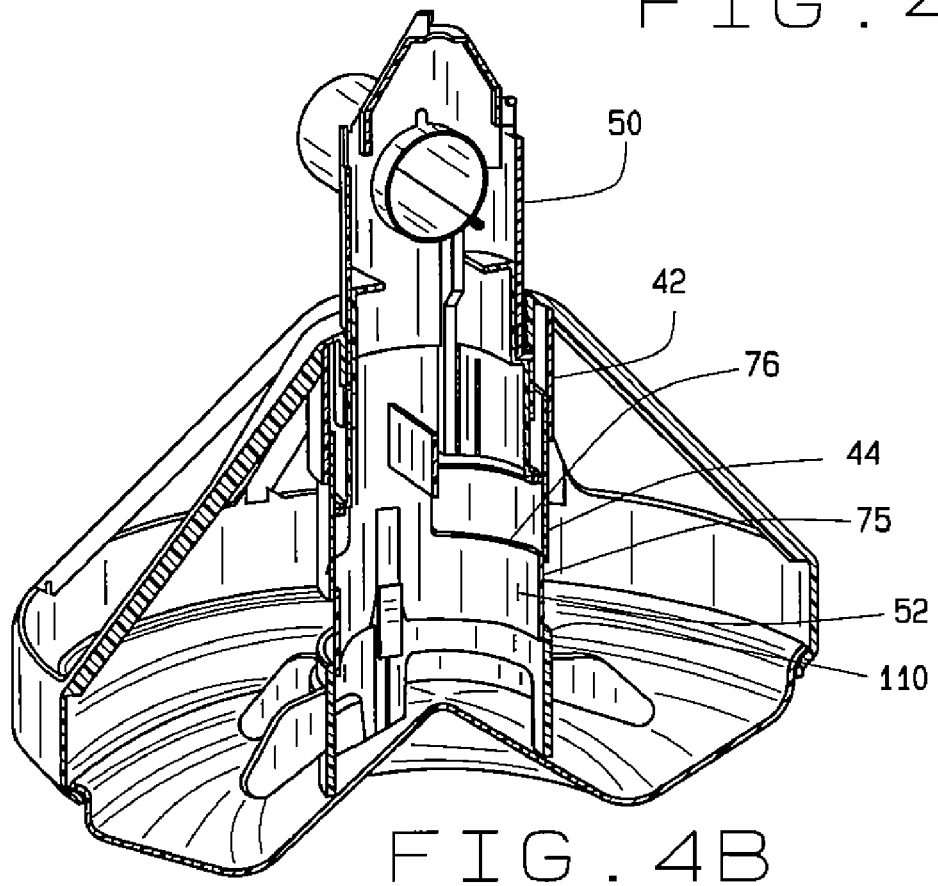

The main portion upper section 58 has a diameter that is smaller than the main portion bottom section 54. Hence, the upper section 58 and bottom section 54 are separated by a shoulder 64. The bottom section 54 has a diameter greater than the inner diameter of the grill ring 38 and tube 39. Hence, in certain operating positions of the feeder 10 (as seen in FIGS. 3B, 4B and 5B), the grill tube 39 will sit on the shoulder 64, and the grill 16 will then effectively be supported by the drop tube 40. At its upper end, the bottom tube section 54 includes a pair of opposed slots 70. At its lower end, the bottom section 54 includes generally circumferential flange 72.

The drop tube extension 52 (FIGS. 7A-C) includes an extension body 74 which is shaped complementarily to the bottom section 54 of the drop tube main portion 50. The drop tube main portion bottom section is generally cylindrical, and hence, the drop tube extension 52 is also generally cylindrical, with the drop tube extension body 74 having an outer diameter generally equal to the outer diameter of the bottom section 54 of the drop tube main portion 50. The drop tube extension body 74 includes a wall 75 having at least one window 76 spaced slightly below the top of the drop tube extension body 74. Two windows 76 are shown, and are positioned opposite each other. The windows 76 are shown to be circumferentially (or horizontally) elongate and generally rectangular in side elevational view, as seen in FIG. 7B. In combination, the two windows 76 extend substantially all the way around the drop tube extension body, the two windows being separated by a small area or portion 77 of the wall 75 on opposite sides of the body 74. Although two windows are shown, one window or three or more windows could be provided. Additionally, the windows could be altered in shape, size and orientation. Opposed slots 78 extend upwardly from the bottom of the body 74. The slots 78 each have a lower portion 80 defined by opposed sloped edges 80a and an upper portion 82 defined by generally axially extending edges 82a. The slot 78 extends upwardly a distance such that the upper edge of the slot is approximately level with a mid-point of the windows 76.

A pair of opposed arms 84 extend upwardly from the top of the extension body 74. The arms 84 are set inwardly from the outer edge of the body 74 as seen in FIGS. 7A,B. The distance between the outer surfaces of the arms 84 is about equal to the inner diameter of the bottom section 54 of the drop tube main portion 50, so that the drop tube extension arms 84 can be passed into the main portion bottom section 52. The drop tube arms have a length approximately equal to the height of the bottom section 54 of the drop tube main portion 50. The arms 84 include ears 86 (also visible in FIG. 5A) which are sized and positioned to be received in the slots 70 of the bottom section 54 of the drop tube main portion 50 to secure the drop tube extension 54 to the drop tube main portion 52. The ears are positioned at the top of the arms 84 and have an outer edge 86a which slopes downwardly and outwardly, giving the ears 84 a generally right triangular appearance. As can be appreciated, the sloped nature of the ears allows for the drop tube extension 52 to be snapped into the slot 70 of drop tube main portion 50. A generally horizontal bar 88 extends between the arms 84. The bottom of the bar 88 is generally flush with the top of the extension body 74 and extends upwardly for about one-half the height of the arms 84. The bar 88 provides some rigidity to the arms 84 to limit the amount which the arms 84 can flex. Although shown as two separate pieces, the drop tube extension 52 could be formed with the drop tube main portion 50, such that the drop tube 40 is a unitary one-piece element of the feeder 10.

The feed flooding tube 44 (FIGS. 8A-E) comprises a generally cylindrical body 90 having a side wall 92, a top edge 94 and a bottom edge 96. The feed flooding tube 44 has an inner diameter slightly greater than the outer diameter of the drop tube extension 52 and the bottom section 54 of the drop tube main portion 50. The drop tube assembly 40 is received within the feed flooding tube 44 to be movable axially relative to the feed flooding tube 44, as seen, for example, by comparing FIG. 2B or 3B with FIG. 4B or 5B. A plurality of legs 98 extend downwardly form the bottom edge 96 of the body 90. The illustrative feed flooding tube 44 shown has four legs 98 which are evenly spaced about the feed flooding tube body 90. Hence, the legs define two pair of opposed legs. The outer surface of the legs 98 continues from the outer surface of the feed flooding tube wall 92. To maintain a smooth appearance the, the outer surface of the legs 98 are curved, and have a curvature corresponding to the curvature of the feed flooding tube body 90. In the assembled feeder, the legs 98 rest on the pan cone 22, as seen for example in FIG. 1. The legs therefore define a circle having a diameter smaller than the diameter of the base of the pan cone 22. With the feed flooding tube 44 resting on the pan cone, the spaces between the legs define a lower exit 99 (FIG. 1) through which feed can pass from the feed tube assembly 14 and into the pan 12.

As noted, the illustrative feed flooding tube 44 has four legs 98 which are evenly spaced about the feed flooding tube 44. Hence, the legs 98 define two pair 98a and 98b of opposed legs. The legs 98 of leg pair 98a are provided with guide ribs 100 on the outer surface of the legs. The guide ribs 100 extend upwardly from the bottom of the legs beyond the bottom edge 96 of the feed flooding tube body 90. The legs 98 of the other leg pair 98b each include a groove 102 which extends upwardly from the bottom of the legs and continues above the bottom edge 96 of the feed flooding tube body 90. The grooves 102 each include a series of evenly spaced apart positioning notches 104 positioned near the top of the groove 102. Four notches 104 are shown, with the lowest-most notch being slightly above the bottom edge 96 of the feed flooding tube body 90. The top-most notch 104 is essentially at the top of the groove. The grooves 102 with their positioning notches 104 are positioned on the outer surface of the legs. The legs of the leg pair 98b with the grooves 102 on their outer surfaces also include an inner guide rib 106 on their inner surfaces. The inner guide ribs 106 extend upwardly from the bottom of the legs to a point approximately level with the bottom edge 96 of the feed flooding tube body 90. Guide blocks 108 are positioned on the inner surface of the feed flooding tube body above the inner guide ribs 106. The feed flooding tube 44 can include a raised platform 107 on the inner surface of the legs 98 of the leg pair 98b upon which the guide ribs 106 and the guide blocks 108 are formed.

Figure 8B:
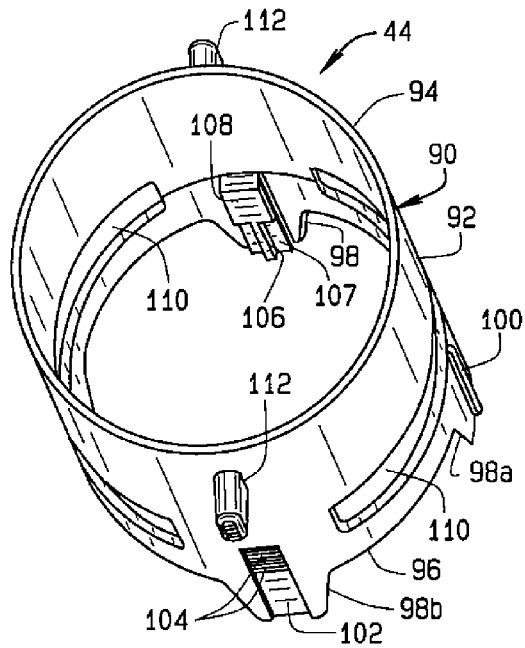
Figure 8C:
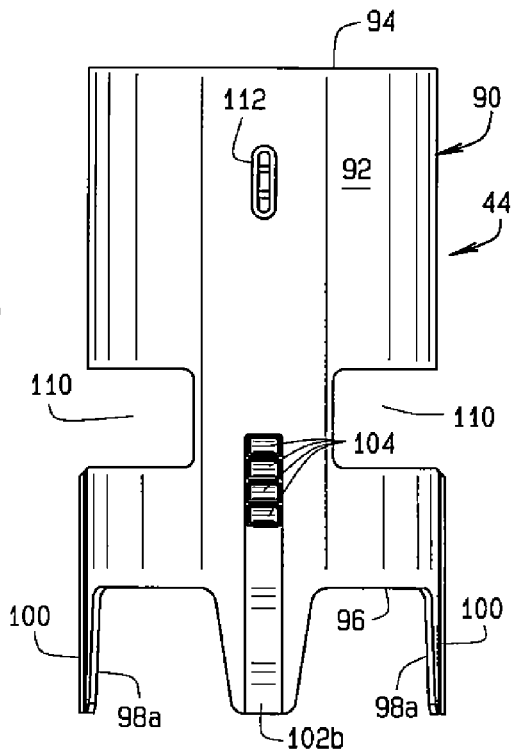
Figure 8D:
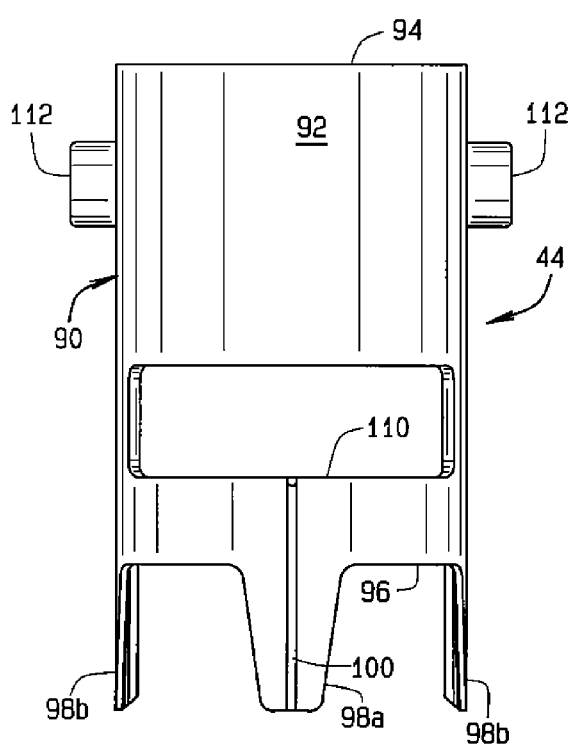
Figure 8E:
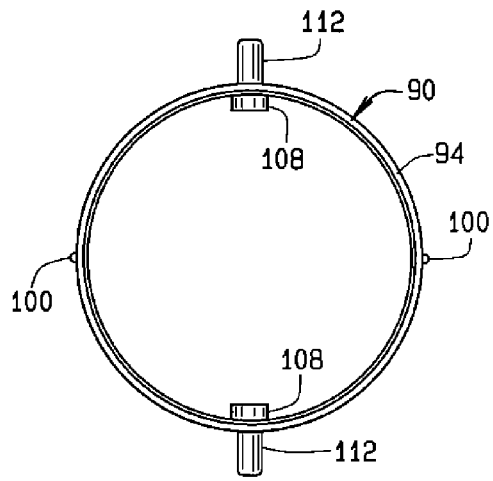

The feed flooding tube body 90 also includes opposed windows 110 positioned above the bottom edge 96 of the body 90. The outer guide ribs 100 extend to the bottom of the windows 110, and the windows 110 are shown to be positioned on the body 90 such that the outer guide ribs 100 extend downwardly from the approximate center of the window 100. As best seen in FIG. 8D, the windows 110 are shown to be generally rectangular in side elevation. The windows 110 could, however, have different sizes or shapes. The legs 98 with the grooves 102 and the inner guide ribs 106 are centered between the windows 110, as best seen in FIG. 8C. The grooves 102 extend upwardly into the space between the windows, such that the top of the groove is about one-third to one-half of the height of the window. The windows 110 are substantially the same size and shape as the windows 76 of the drop tube extension 52. Additionally, the space between the bottom of the drop tube windows 76 and the bottom of the drop tube is at least equal to the height of the feed flooding tube window 110. Thus, the drop tube assembly 40 can be moved between a position in which the drop tube windows 76 are aligned with the feed flooding tube windows 110 (FIGS. 2A,B, 3A,B) such that the feed flooding tube windows 110 are opened and a position in which the drop tube wall blocks or closes the feed flooding tube windows (FIGS. 4A,B, 5A,B). The drop tube extension slot 78 rides on the feed flooding tube alignment block 108 as seen in FIG. 2B to maintain the relative circumferential or rotational position of the drop tube extension 52 relative to the feed flooding tube 44, so that the two windows 76 and 110 will be vertically aligned. Lastly, the feed flooding tube 44 includes opposed arms 112 positioned vertically above the grooves 102 and spaced slightly below the feed flooding tube body top edge 94.

The locking collar 42 (FIGS. 9A-C) is a generally cylindrical member having a side wall 120, a top edge 122 and a bottom edge 124. The collar 42 has an inner diameter slightly greater than the outer diameter of the feed flooding tube 44 so that the collar 42 can move axially and circumferentially relative to the feed flooding tube 44, as can be seen by comparing FIGS. 4B and 5B. The top edge 122 is shown to be rounded and the bottom edge 124 is shown to be generally squared. However, both edges could be rounded or both edges could be squared. Further, the bottom edge could be rounded and the top edge could be squared. A pair of opposed ears 126 extend outwardly from the wall 120 near the bottom of the wall 120. The two ears 126 are shown to be spaced apart by about 180° (i.e., are on opposite sides of the collar 42). The ears 126 are generally trapezoidal in shape, having downwardly and outwardly sloping surfaces 126a extending between generally horizontal upper and lower surfaces. The collar bottom edge 124 includes scalloped sections 130 formed by a plurality of adjacent curved indentations 130a. The ears 126 are generally centered relative to the scalloped sections 130.

Opposed slots 132 extend upwardly from the collar bottom edge 124. The slots 132 are sized to fit over (or receive) the arms 112 of the feed flooding feeding tube 44. The slots 132 have one edge 132a that is generally straight and a second opposite edge that has a lower curved section 132b which merges into a straight section 132c. The curved edge 132b curves away from the edge 132a to define a wider lower or entrance section 133 to the slot 132. The slots 132 are proximate the ears 126 and the scalloped sections 130. In fact, the slot curved edge 132b meets up with an end indentation 130a of the scalloped section 130. The collar 42 is sized, such that when the collar 42 rests on the ears 112 of the feed flooding tube 44, the top edge of the collar will engage the underside of the grill ring 38 in the space between the grill spoke ribs 36b and the grill tube 39 to raise the grill wall 30 a distance sufficient such that the grill wall bottom lip 34 is proximate the pan lip 28.

Lastly, the feed level ring 46 (FIG. 10) includes an annular ring body 140 having an inner surface 142 and an outer surface 144. A skirt 145 extends outwardly and downwardly from the bottom of the ring body. Opposed guide grooves 146 extend axially the length of the body inner surface 142. The guide grooves 146 are sized to receive and ride on the outer guide ribs 100 on the feed flooding feed tube 44. A plurality of fins 148 extend outwardly and downwardly from the outer surface 144 of the ring body 140 and from the skirt 145. The fins 148 have bottom edges below the bottom of the skirt 145. Lastly, the feed level ring 46 includes a pair of flexible arms 150 extending upwardly from the ring body 140. The arms 150 each include an inwardly extending finger 152 and an outwardly extending lever 154. The fingers 152 are sized and shaped to be received in the positioning notches 104 of the feed flooding tube 44. By selecting which positioning notch 104 the fingers 152 engage, the height of the feed level ring 46 relative to the feed flooding tube 44 can be selected. The arms 150 are flexible. Hence, the fingers 152 can be disengaged from the notches 104 by pressing down on the levers 154. This will allow for an operator to change the position of the feed level ring 46 relative to the feed flooding tube 44 to thereby adjust the effective height of the lower exit 99. The fingers 152 of the feed level ring 46 and the feed flooding tube positioning notches 104 are positioned such that the bottom of the feed level ring will be above the bottom of the feed flooding tube legs 98, such that the feed exit 99 at the bottom of the feed flooding tube 44 will always be opened.

To assemble the feeder 10, the drop tube extension 52 and the drop tube main portion 50 are snapped together to form the drop tube assembly 40. As noted above, the drop tube main portion 50 is constructed generally in accordance with the teachings of U.S. Pat. No. 6,470,826 which is incorporated herein by reference. As noted therein, the drop tube main portion is actually a two piece member. Thus, the drop tube main body will need to be assembled. Although he drop tube 40 is disclosed to be of two parts (i.e., the drop tube extension and the drop tube main body), the drop tube 40 could be formed such that the drop tube extension 52 is incorporated into the drop tube main body 50, thereby reducing the number of parts in the drop tube assembly 40. As can be appreciated, the drop tube assembly 40 will have to be assembled about the feed conduit 65 of the feeding system, and hence, the grill 16 will need to be positioned on the drop tube assembly 40 during assembly of the drop tube assembly 40.

The feed level ring 46 is applied to the feed flooding tube 44 and the locking collar 42 is positioned over the feed flooding tube 44. The feed flooding tube 44 with the locking collar 42 and the feed level ring 46 is then slid over the bottom of the drop tube assembly 40. That is, the drop tube 40 is telescopingly received within the feed flooding tube 44. The pan 12 is then secured to the grill by snapping the pan lip 28 into place between the upper and lower lips 32 and 34 of the grill wall 30.

The slots 78 in the bottom of the drop tube extension 52 are sized to fit over the positioning blocks 108 in the feed flooding feed tube 44. Hence, the positioning blocks 108 act as stops to limit how far the drop tube assembly can pass into the feed flooding tube 44. The windows 110 of the feed flooding tube 44 and the windows 76 of the drop tube extension are positioned such that, when the drop tube assembly is resting on the blocks 108 (i.e., is at its lowest position relative to the feed flooding tube), the drop tube windows 76 will be aligned with the feed flooding tube windows 110 to form an upper exit through which feed can pass out of the feed tube assembly 14, as seen in FIG. 2B. By raising the feed tube assembly 40 relative to the feed flooding tube 44, the bottom portion of the feed tube extension 52 will block the feed flooding tube windows 110, thereby closing this upper exit, as seen in FIG. 4B.

When the feeder 10 is assembled, the feed tube assembly 14 will be trapped between the pan 12 and the ring 38 of the grill 16, and hence, the feed flooding tube 44 and drop tube 40 cannot be separated from each other during normal operation. As noted above, the grill 16 can be moved vertically relative to the pan 12 and the drop tube assembly 40 can be moved vertically relative to the feed flooding tube 44. As seen by comparing FIGS. 2A,B and 3A,B, by rotating the locking collar relative to the feed flooding tube, the locking collar can be moved from a lowered position in which locking collar slot 132 receives the feed flooding tube arms 112 (FIGS. 3A,B) to a raised position in which the bottom of the locking collar 42 rests on the arms 112 of the feed flooding tube 44 (FIGS. 2A,B), the collar 42 will raise the grill 16 relative to the pan. In this condition, the feeder pan 12 will have an effectively higher wall height, than when the grill is lowered. The ears 126 on the locking collar can be used to facilitate movement of the locking collar relative to the feed flooding tube 44.

Additionally, the drop tube assembly 40 can be moved vertically relative to the feed flooding tube 44 to selectively bring the windows 76 of the drop tube extension into and out of alignment with the feed flooding tube windows 110. When the drop tube is raised relative to the feed flooding tube (FIGS. 4A,B, 5A,B), and the feed flooding tube windows 110 are closed by the lower portion of the drop tube extension 44, feed can only exit the feed tube assembly 14 through the bottom exit 99 of the feed tube. In this position, the feeder is in a shallow-fill mode, and the height of the feed in the pan will be dictated in part by the height of the feed level ring 46 relative to the feed flooding tube 44. However, when the drop tube assembly 40 is lowered relative to the feed flooding tube 44, (FIGS. 2A,B, 3A,B), the drop tube extension windows 76 will be aligned with the feed flooding tube windows 110, and feed can exit both through the bottom of the feed tube assembly and through the windows 110, 76. In this position, the feeder will be in a flood-fill mode to operate as a flood feeder.

Because the drop tube assembly 40 can be moved independently of the grill by operation of the locking collar 42, when the feeder is in the flood-fill mode, the grill can be moved between a first lowered position relative to the pan (i.e., with a lower effective pan wall height) and a second, raised position relative to the pan (i.e., with a higher effective pan wall height), as seen in FIGS. 1A, B and 2A,B. The advantage of this design, relative to currently available flood feeders, is that when the grill is in the lowered position not as much feed is needed to flood the pan (and attract the chicks) as in a typical flood feeder which has a pan depth much more like the raised position of the feeder 10. Thus not as much grain is at risk for spoiling due to flooding a shallow pan to feed chicks and maintaining the same flood level for mature birds.

Figure 2A:
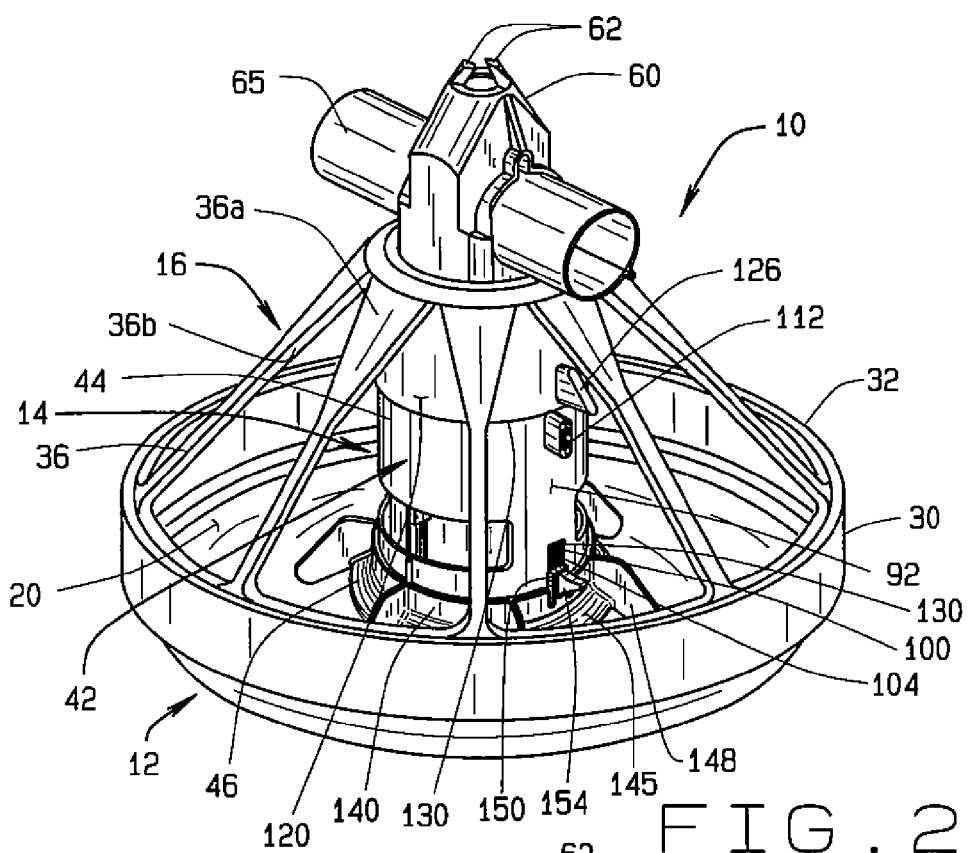
FIGS. 2A and 2B are perspective and cross-sectional views, respectively, of the feeder in a flood-fill mode in a deep pan configuration.
Figure 2B:
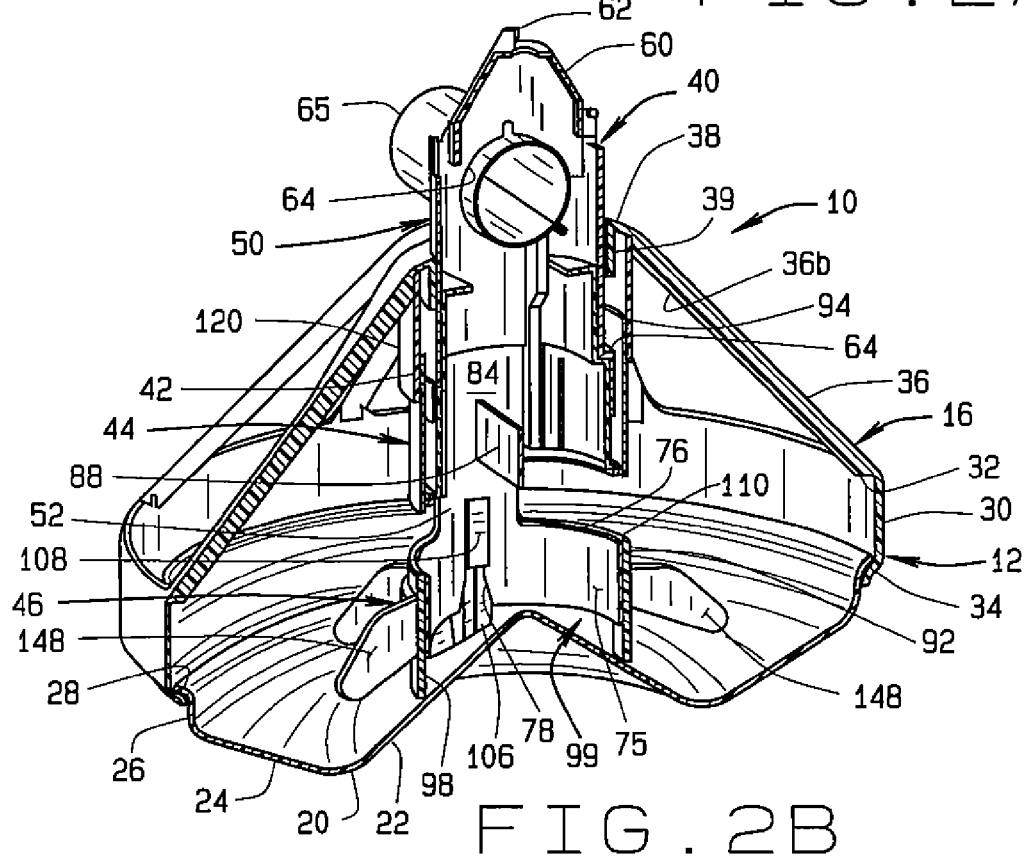

The different modes of operation are shown in FIGS. 2A,B, 3A,B, 4A,B and 5A,B. In FIGS. 2A,B the drop tube 40 is lowered relative to the feed flooding tube 44, opening the feed flooding tube windows 110. In this position, feed can enter the pan from the drop tube through the bottom of the drop tube (through the lower exits 99 at the bottom of the feed tube assembly 14) and through the feed flooding tube windows 110. Hence, the feeder is shown in a floodfill mode. Additionally, as seen, the bottom edge of the locking collar 42 is resting on the feed flooding tube arms 112. This locks the grill in a raised position, providing the feeder with a deep pan condition.

In FIGS. 3A,B, the feeder is again shown in a flood-fill mode. However, the locking collar has been rotated relative to the feed flooding tube 44 such that locking collar slots 132 ride down over the feed flooding tube arms 112. This allows the grill 16 to be lowered, such that the feeder has a shallow pan depth. As can be appreciated, with the shallow pan, it will be easier for chicks to gain access to the feed within the feeder pan.

In FIGS. 4A,B, the feeder is shown with the feed tube 40 raised relative to the feed flooding tube such that the feed flooding tube windows 110 are closed by the feed tube extension wall 75. In this position, feed can only exit the feed tube assembly 14 through the exits 99 at the bottom of the feed flooding tube 44. Hence, the feeder is in a shallow-fill mode. That is, the feed will only fill the pan up to the level of the feed level ring. This will provide a shallow layer of feed in the pan 12 which covers essentially the pan cone 22 and pan floor 20. In FIGS. 4A,B, the bottom of the locking collar is riding on the feed flooding tube arms 112, to maintain the grill in a raised position, such that the feeder is in a deep pan configuration. Because the grill is raised, chickens will be able to access the feed in the pan, however, chicks may not be able to access the feed in the pan.

Figure 5A:
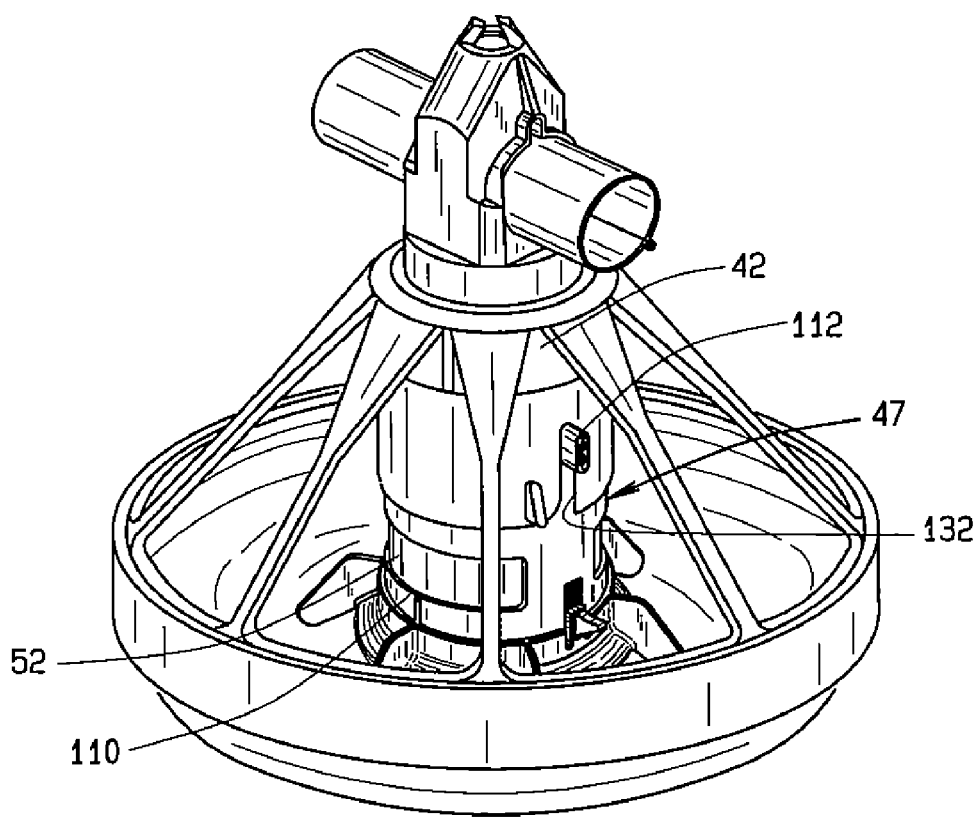
FIGS. 5A and 5B are perspective and cross-sectional views, respectively, of the feeder in a shallow-fill mode in a deep pan configuration, but with a locking collar in an unlocked position.
Figure 5B:
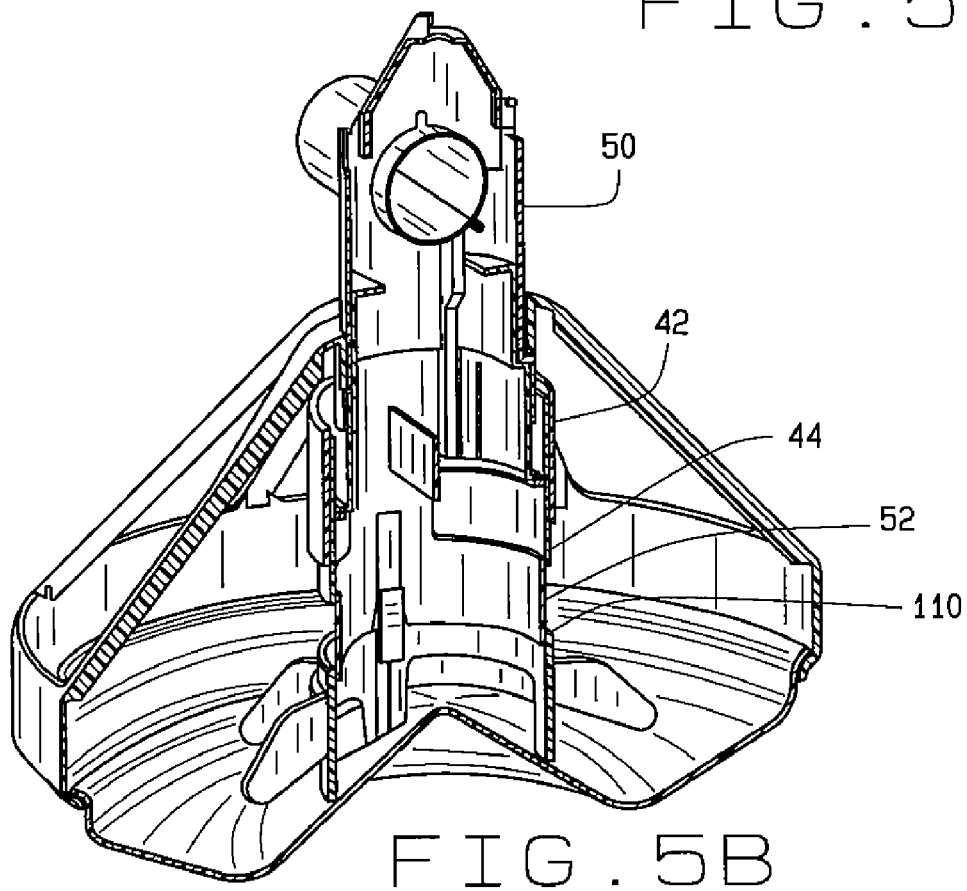

In FIGS. 5A,B, the feeder is shown in a shallow-fill mode, but with the locking collar 22 lowered relative to the feed flooding tube 44. Hence, although the feeder is shown with a raised pan wall 30 to give the pan a deep pan configuration, the grill could be lowered to provide for a shallow pan configuration.

As can be seen from the figures and the above description, the locking collar 42 and feed flooding tube 44 remain stationary, and the drop tube assembly 40 moves relative to the locking collar and feed flooding tube to open and close the feed flooding tube window 110. In an alternative embodiment, the separate locking collar 42 and feed flooding tube 44 could be replaced with two separate feed flooding tubes—one short tube and one long tube. The short tube would have a height generally equal to the height of the locking collar and feed flooding tube when the locking collar is in its lowered position, as seen in FIGS. 3A and 3B. The long tube, on the other hand, would have a height generally equal to the height of the locking collar and feed flooding tube when the locking collar is in its raised position, as seen in FIGS. 2A and 2B.

In a further alternative, the window 76 on the drop tube extension could be eliminated, and the drop tube extension would then simply comprise a solid sleeve. This would be a "short" drop tube (at least relative to the drop tube 40). With this variation, the operation of the feeder would essentially be reversed—that is, the feed flooding tube window 110 would be opened when the drop tube assembly 40 is raised and closed when the drop tube assembly is lowered.

In the current embodiment, when the grill is in a collapsed position and the locking collar is in its lowered position, as seen in FIGS. 3A and 3B, the feed flooding tube window 110 is opened. With the current embodiment, the feed flooding tube window cannot be closed when both the grill and the locking collar in the collapsed position. This can be remedied, for example, by lowering the shoulder 64 of the drop tube main portion 50 could be lowered relative to the drop tube main portion, and/or shortening the grill ring tube 39. This would increase the amount of travel of the drop tube before the shoulder 64 engages the bottom rim of the grill ring tube 39. As can be seen from FIG. 3B, if there were space between the drop tube shoulder 64 and the bottom of the grill ring tube 39, the drop tube 40 could be raised without raising the grill. This would allow the drop tube 40 to be moved between a position in which the feed flooding tube window 110 is opened and a position in which the feed flooding tube window 110 is closed.

In another alternative, the drop tube extension can be provided with a tab or the like which would be aligned with, and extend through, the feed flooding tube window. In the drop tube 40, the tab will be positioned at the bottom of the drop tube window 76, such that the tab will engage the bottom of the feed flooding tube window 110 when the drop tube is in its lowered position and the feed flooding tube window is opened. As the drop tube is raised, the feed flooding tube window would first be closed by the bottom wall 75 of the drop tube. Further raising of the drop tube after the tab engages the top of the window 110 (when the drop tube wall 75 closes the feed flooding tube window 110), would then raise the feed flooding tube (and the feed level ring) relative to the pan. As can be appreciated, this would allow for a deeper level of feed when the feeder is being operated in the shallow feed mode.

On the other hand, if the drop tube were the "short" version described just above (without the window), the tab would be positioned at the bottom of the drop tube, such that the tab would engage the bottom of the feed flooding tube window 110 when the drop tube is lowered and the window 110 is closed. As the drop tube is raised, the window will be opened. Any further raising of the drop tube after the tab engages the top of the feed flooding tube window (when the window 110 is fully opened) will result in raising the feed flooding tube window (with the window opened). This would thus allow for increasing the depth of the feed in the pan when the feeder is being operated in a flood mode.

As can be appreciated, the drop tube assembly 14 comprises a means for changing feeder between a one mode of operation wherein the feeder operates as a flood feeder and another mode of operation wherein the feeder operates as a feeder having adjustable pan height (i.e., such as the Cumberland Hi-Lo® feeder). As described above, when the drop tube 40 is in a lowered position, the flood feed tube windows 110 will be opened and feed can exit through the flood feed tube windows 110 and the lower exit 99 to enable the feeder to operate in a flood mode. When the feed tube is in its raised positioned, the flood feed tube windows 110 are closed by the feed tube 40, and hence, feed can only exit the feed tube assembly through the bottom exits 99, such that the feeder 10 operates in a shallow feed mode, and wherein the effective height of the pan walls can be altered by raising or lowering the grill. The raising and lowering of the grill is accomplished by means of the locking collar.

In operation, the feeder 10 can be selectively moved through its various configurations by raising and lowering of the feed tube when the locking collar slot 132 rides on the feed flooding tube arm 112 (i.e., when the locking collar 42 is in a lowered position relative to the feed flooding tube 44). When the feeder is sitting on the ground with the drop tube lowered, the feeder will be in the position shown in FIGS. 3A,B. That is, the feeder will be in a flood-fill mode. As the drop tube 40 is raised, the drop tube extension 52 will begin to close off the feed flooding tube window 110. Because the feed flooding tube 44 does not move relative to the pan, the upper edge of the window 110 does not move. Thus, the effective size of the window 110 can be altered, but the upper position of the window 110 cannot be altered. Hence, the level of feed in a fully flooded pan will not be altered by movement of the feed tube 40 relative to the feed flooding tube. Because the grill ring tube 39 rests on the drop tube shoulder 64, the grill 16 will also be raised. Once the feed flooding tube windows 110 are closed, the pan will be in a deep pan position. Thus, the feeder 10 will start out in the position shown in FIGS. 3A,B (in a flood-fill mode in a shallow pan condition) and by raising the drop tube assembly 40, the feeder will be switched to a shallow-fill mode in a deep pan condition, as shown in FIGS. 5A,B.

As various changes could be made in the above constructions without departing from the scope of the invention, it is intended that all matter contained in the above description or shown in the accompanying drawings shall be interpreted as illustrative and not in a limiting sense.

The invention claimed is:

1. A poultry feeder(10) comprising:
 a pan having a floor and a side wall;
 a grill having an annular wall which surrounds the pan side wall and is movable relative to the side wall between a lowered position in which the feeder has an effective lower wall height and a raised position in which the feeder has an effective higher wall height; the grill further including a plurality of spokes extending from a top of the annular wall and a ring connecting upper ends of said spokes; and
 a feed tube assembly; the feed tube assembly comprising:
  a drop tube having an upper portion which extends through said grill ring and a lower portion, said upper portion having opposed openings through which a feed conduit can pass; said lower portion having a dimension greater than an inner diameter of said grill ring, such that said grill ring is supported by said drop tube lower portion;
  a feed flooding tube sized and shaped to axially receive said drop tube; said feed flooding tube having a bottom edge, legs extending down from said bottom edge, and a feed flooding tube window spaced above said feed flooding tube bottom edge; said legs supporting said feed flooding tube on said pan such that the bottom edge of said feed flooding tube is spaced above said pan floor; spaces between said legs defining a lower exit through which feed can pass from said feed tube assembly into said pan; and
  a locking collar sized fit over said feed flooding tube and shaped to be movable axially and rotationally relative to said feed flooding tube; said locking collar being movable axially on said feed flooding tube between a raised position in which said locking collar supports said grill in the grill's raised position and a lowered position;
 said drop tube being selectively movable between a first position relative to said feed flooding tube in which said feed flooding tube window is opened to define an upper exit through which feed can pass to enter said pan and a second position relative to said feed flooding tube in which said feed flooding tube window is closed, such that said upper exit is closed; and
 when said drop tube is in at least one of said first and second positions, said grill can be selectively moved between its raised and lowered positions to selectively adjust the effective height of said pan wall.

2. The feeder of claim 1 wherein said drop tube lower portion includes a drop tube window spaced above the bottom of said drop tube; said feed flooding tube window having a height no greater than the distance between the bottom of the drop tube and the bottom of the drop tube window;
 said drop tube being selectively movable between a lowered position relative to said feed flooding tube in which drop tube window is aligned with said feed flooding tube window to define an upper exit through which feed can pass to enter said pan and a raised position relative to said feed flooding tube in which said portion of said drop tube below said drop tube window closes said feed flooding tube window, such that said upper exit is closed; whereby, when said drop tube is in said lowered position both said upper and lower exits are opened to flood said feeder and when said drop tube is in said raised position only said lower exit is opened.

3. The feeder of claim 2 wherein when said drop tube is in said lowered position, said grill can be selectively moved between its raised and lowered positions to selectively adjust the effective height of said pan wall.

4. The feeder of claim 1 wherein said drop tube is moveable relative to said feed flooding tube to selectively open and close said feed flooding tube window when said grill is in at least one of a raised position and a lowered position.

5. The feeder of claim 4 wherein said drop tube is moveable relative to said feed flooding tube to selectively open and close said feed flooding tube window when said grill is in a raised position and when said grill is in a lowered position.

6. The feeder of claim 1 wherein said locking collar is movable between a first position in which said grill can be raised or lowered and a second position in which said grill is maintained in a raised position.

7. The feeder of claim 6 wherein said locking collar surrounds said feed flooding tube; said flood feeding tube having an arm extending outwardly therefrom; said locking collar including a slot extending upwardly from a bottom surface of said locking collar; whereby, said locking collar is in said first position, said locking collar bottom surface rests on said flood feeding tube arm and when said locking collar is in said second position, said locking collar slot rides over said feed flooding tube arm.

8. The feeder of claim 1 wherein said drop tube upper and lower portions are separate members; said drop tube lower portion being connectable to said drop tube upper portion.

9. The feeder of claim 1 wherein said drop tube includes a slot extending upwardly from a bottom of said drop tube and said feed flooding tube includes a guide; said drop tube slot receiving said guide.

10. A poultry feeder comprising:
   a pan having a floor and a side wall;
   a grill having an annular wall which surrounds the pan side wall and is movable relative to the side wall between a lowered position in which the feeder has an effective lower wall height and a raised position in which the feeder has an effective higher wall height; the grill further including a plurality of spokes extending from a top of the annular wall and a ring connecting upper ends of said spokes; and
   a feed tube assembly comprising;
      a drop tube having an upper portion which extends through said grill ring and a lower portion, said upper portion having opposed openings through which a feed conduit can pass; said lower portion having a dimension greater than an inner diameter of said grill ring, such that said grill ring is supported by said drop tube lower portion; said lower portion including a drop tube window spaced above the bottom of said drop tube;
      a feed flooding tube sized and shaped to axially receive said drop tube; said feed flooding tube having a bottom edge, legs extending down from said bottom edge, and a feed flooding tube window spaced above said feed flooding tube bottom edge; said feed flooding tube window having a height no greater than the distance between the bottom of the drop tube and the bottom of the drop tube window; said legs supporting said feed flooding tube on said pan such that the bottom edge of said feed flooding tube is spaced above said pan floor; spaces between said legs defining a lower exit through which feed can pass from said feed tube assembly into said pan;
      means for changing said feeder between a first flood-fill mode of operation wherein the feed flooding tube window is opened such that feed can exit through said feed flooding tube window whereby feeder operates as a flood feeder and a second shallow-fill mode of operation wherein the feed flooding tube window is closed such that feed only exits through said lower exit whereby said feeder operates as a shallow-fill feeder; wherein said means for changing comprises said feed tube assembly; said feed tube assembly being movable between a lowered position in which said drop tube window is aligned with said feed flooding tube window to enable feed to exit said feed tube assembly through said feed flooding tube window and a raised position in which said feed flooding tube window is closed, whereby feed can exit said feed tube assembly only through an exit at a bottom of said feed tube assembly; and,
      height changing means for altering the effective height of said pan; wherein said height changing means comprises a locking collar; said locking collar being sized to fit over said feed flooding tube and shaped to be movable axially relative to said feed flooding tube between a raised position; said locking collar being movable axially on said feed flooding tube between a raised position in which said locking collar supports said grill in the grill's raised position and a lowered position.

11. The poultry feeder of claim 10 wherein said locking collar is selectively movable between a raised position in which said feeder is locked in a deep pan mode and a lowered position in which said feeder is selectively movable between a deep pan mode and a shallow pan mode.

12. The poultry feeder of claim 10 wherein said height changing means comprises a pair of interchangeable feed flooding tubes; said pair of interchangeable feed flooding tubes comprising a first short tube which supports said grill in said lowered position and a second longer tube which supports said grill in said raised position.

13. The poultry feeder of claim 10 wherein said height adjusting means is operable to alter the effective depth of said pan at least when said feeder is in the shallow-fill mode.

\* \* \* \* \*